Jan. 13, 1970  G. G. JIMENEZ, JR  3,489,489
SIGHTING DEVICE FOR VACUUM VESSELS
Filed Jan. 16, 1967
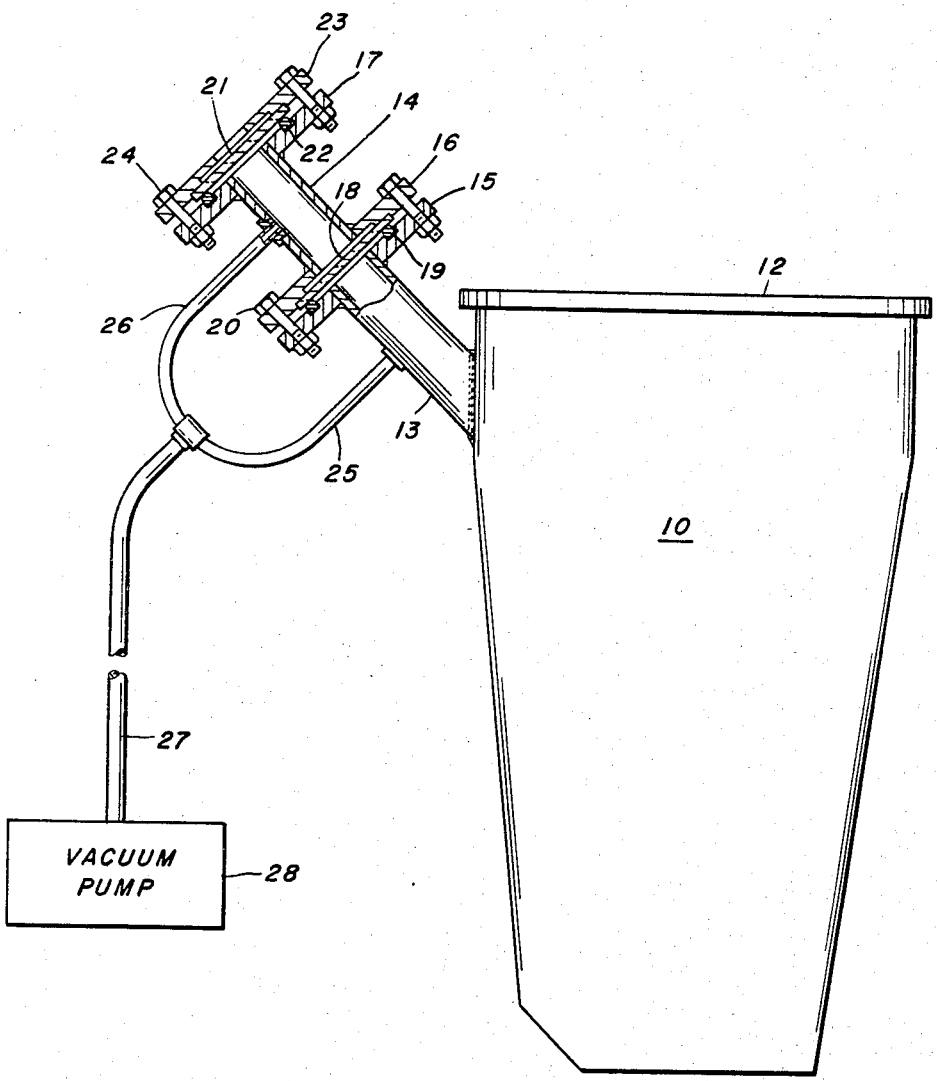
INVENTOR.
GEORGE G. JIMENEZ, JR.
By Donald G. Dalton
Attorney

United States Patent Office 3,489,489
Patented Jan. 13, 1970

3,489,489
SIGHTING DEVICE FOR VACUUM VESSELS
George G. Jimenez, Jr., 8901 S. 49th Ave.,
Oak Lawn, Ill. 60453
Filed Jan. 16, 1967, Ser. No. 609,669
Int. Cl. G02f 3/00; G01f 23/02
U.S. Cl. 350—319            2 Claims

ABSTRACT OF THE DISCLOSURE

A sighting device for a vacuum vessel. The device has inner and outer lenses with an intervening vacuum chamber to prevent loss of vacuum in the event one lens is damaged.

---

This invention relates to an improved sighting device for vacuum vessels to permit observation of reactions within the vessel.

Although the invention is not thus limited, the device is particularly useful as applied to a vacuum degassing apparatus for steel. Conventionally such apparatus includes a vessel which receives molten steel under vacuum. The vessel is equipped with a sight-tube to enable an observer to watch reactions as they take place within the vessel. The tube has a glass lens sealed at its edges to prevent entrance of air. Sparks or hot metal often reach the lens and crack it, thus breaking the vacuum and rendering the degassing process ineffective for the particular heat within the vessel. Nevertheless it is apparent my invention may have broader application, particularly where similar problems are encountered.

An object of my invention is to provide an improved sighting device which offers protection against loss of vacuum even though the lens may crack or break.

A more specific object is to provide a sighting device which includes a pair of spaced-apart sealed lenses with an intervening vacuum chamber, whereby the inner lens may crack without affecting the seal at the outer lens.

In the drawing:

The single figure is a side elevational view partly in section of a vacuum vessel equipped with my improved sighting device.

The drawing shows a vacuum vessel 10, such as that used in degassing steel. The vessel has a sealed cover 12. The sighting device of my invention includes lower and upper aligned tubes 13 and 14. The lower tube 13 is rigidly fixed to the side of vessel 10 near the top and extends at an oblique angle therefrom. The upper end of this tube has a flange 15 rigidly fixed thereto. Likewise the lower and upper ends of tube 14 have flanges 16 and 17 respectively rigidly fixed thereto. I mount a glass inner lens 1 and a resilient O-ring 19 between the confronting flanges 15 and 16 of the two tubes. I fasten these flanges together with bolts 20. I mount a glass outer lens 21 and another resilient O-ring 22 over the flange 17 at the upper end of tube 14. I fasten the latter parts together with a retaining ring 23 and bolts 24. I connect two branches 25 and 26 of a vacuum line 27 to the respective tubes 13 and 14. Line 27 leads to a suitable conventional vacuum pump 28, indicated diagrammatically.

In operation, I evacuate both the lower and upper tubes 13 and 14, along with the vessel 10. The O-rings 19 and 22 afford seals at both lenses 18 and 21. I can observe reactions within the vessel by looking through the aligned lenses and tubes. The inner lens 18 may crack, as it is located where metal may splash against it or sparks may hit it. If this happens, the outer lens 21 still affords a seal against air entering the vessel. The outer lens of course is located where there is little likelihood of its becoming damaged. Thus the invention provides a simple structure for maintaining the vacuum when lens failure occurs.

I claim:
1. The combination, with a vacuum vessel, of a sighting device through which reactions within the vessel may be observed, said device comprising first and second aligned tubes, said first tube being fixed to said vessel, an inner lens mounted between the ends of said tubes, an outer lens mounted at the end of said second tube remote from said inner lens, means providing seals between both said lenses and said tubes, fastening means fixing said tubes to each other and said outer lens to said second tube, a line connected to said first tube, another line connected to said second tube, vacuum pump means connected to said lines for evacuating both said tubes, whereby the vacuum is maintained when said inner lens fails.

2. A combination as defined in claim 1 in which said tubes have confronting flanges fixed to their respective ends between which said inner lens is mounted, and said second tube has another flange at its other end on which said outer lens is mounted, said seals including resilient O-rings.

References Cited
UNITED STATES PATENTS

| 3,407,662 | 10/1968 | Tarbox. | |
| 1,298,611 | 3/1919 | West | 350—67 X |
| 2,989,787 | 6/1961 | Smith | 350—67 X |
| 3,170,383 | 2/1965 | Hunt | 220—82 X |
| 3,373,610 | 3/1968 | Stieber | 73—334 |
| 3,380,303 | 4/1968 | Le Roy. | |

DAVID SCHONBERG, Primary Examiner

T. H. KUSMER, Assistant Examiner

U.S. Cl. X.R.

73—334; 116—117